United States Patent [19]

Rossmann et al.

[11] Patent Number: 4,692,288
[45] Date of Patent: Sep. 8, 1987

[54] METHOD OF HOT ISOSTATIC PRESSING OF A POROUS SILICON CERAMIC COMPACT

[75] Inventors: Axel Rossmann; Werner Huther, both of Karlsfeld, Fed. Rep. of Germany

[73] Assignee: MTU Motoren-und Turbinen-Union Munchen GmbH, Munich, Fed. Rep. of Germany

[21] Appl. No.: 199,152

[22] Filed: Oct. 21, 1980

[30] Foreign Application Priority Data

Nov. 10, 1979 [DE] Fed. Rep. of Germany ....... 2945513

[51] Int. Cl.[4] ............................................. C04B 35/62
[52] U.S. Cl. ....................................... 264/56; 264/62; 264/325; 264/332
[58] Field of Search ..................... 264/325, 332, 56, 62

[56] References Cited

U.S. PATENT DOCUMENTS

| Re. 28,301 | 1/1975 | Havel | 264/332 |
|---|---|---|---|
| 3,469,976 | 9/1969 | Iler | 264/332 |
| 3,562,371 | 2/1971 | Bush | 264/332 |
| 3,892,835 | 7/1975 | Holdsworth | 264/332 |
| 4,023,966 | 5/1977 | Loersch | 264/332 |
| 4,112,143 | 9/1978 | Adlerborn | 264/332 |
| 4,164,527 | 8/1979 | Bakul | 264/325 |
| 4,256,688 | 3/1981 | Adlerborn | 264/332 |
| 4,264,546 | 4/1981 | Becker | 264/332 |

FOREIGN PATENT DOCUMENTS

| 2349277 | 4/1975 | Fed. Rep. of Germany . |
|---|---|---|
| 2601294 | 8/1976 | Fed. Rep. of Germany . |
| 2812019 | 9/1979 | Fed. Rep. of Germany . |
| 1387415 | 3/1975 | United Kingdom . |
| 1440893 | 6/1976 | United Kingdom ................ 264/332 |
| 1500108 | 2/1978 | United Kingdom . |
| 1529966 | 10/1978 | United Kingdom . |
| 2010913 | 7/1979 | United Kingdom . |

OTHER PUBLICATIONS

Lange et al., "The Powder Vehicle Hot Pressing Technique", Cir. Bull, vol. 52, No. 7, (1973), pp. 563-565.

Primary Examiner—James Derrington
Attorney, Agent, or Firm—Alan H. Levine

[57] ABSTRACT

A method including embedding a porous silicon ceramic compact, or workpiece, in a powder which is not sinterable at the process temperature, and subjecting the powder and embedded compact to heat and pressure in a hot isostatic press. The powder transmits the pressure to the compact. The powder may be the same material as the compact, except without a sintering agent, or the powder may be graphite powder. The grain size of the powder is between 2 μm and 50 μm. The powder and embedded compact are placed in a container prior to hot pressing; the container may be made of thin sheet metal or of quartz glass.

12 Claims, No Drawings

METHOD OF HOT ISOSTATIC PRESSING OF A POROUS SILICON CERAMIC COMPACT

This invention relates to a method of hot isostatic pressing (HIP) of porous, silicon ceramic compacts.

An invariable requirement in such a method is preventing the gasous pressing medium from penetrating into the open pores of the compact. This can be achieved with the aid of an adequately ductile or flexible layer or compound layers applied directly on to the compact. German printed patent specification DE-OS No. 26 01 294 discloses a method wherein the compact, or workpiece, is embedded, within an evacuated glass container, in glass powder, the latter being converted during the hot isostatic pressing process into a glass envelope of high viscosity. A method has also been disclosed wherein, in the hot isostatic pressing process, use is made of molten metal as a pressure-transmitting medium.

The methods disclosed to date are less than ideal because the glass envelope, as it is developing, can react with the compact, or sometimes tears as a result of differences in thermal expansion during the HIP process. In addition, the coating material may exhibit a low viscosity during the HIP process so that it is forced into the open pores of the compact thereby impairing the properties of the component made from the compact. Further difficulties reside in the problem of removing, after the HIP process when the compact is fully pressed, the envelope that during the HIP process was intimately united with the compact, without damaging the surface of the compact.

It is a broad object of the present invention to provide a method for producing, on the one hand, a safe, gas-tight envelope around the porous compact during the HIP process and, on the other hand, for removing the envelope without difficulty after the HIP process and, importantly, without impairing the surface of the fully pressed compact. The method further precludes any chemical reaction between the silicon ceramic material of the compact and the material of the pressure-transmitting medium or its constituents.

It is a further object of the present invention to provide a method wherein the porous compact is pressed while embedded in a powder which is not sinterable at the process temperature, if sinterable at all.

Use of a non-sinterable powder held inside a vessel makes it possible to achieve the requisite gas-tight condition while preventing intimate union between the ceramic compact and the pressure-transmitting powder. As a result, the powder can be removed completely after the HIP process simply by tapping, whereby the surface of the ceramic compact is not impaired.

In a preferred embodiment of the present invention, the powder consists of the same material as the compact, except that the sintering agent is omitted. This definitely prevents any chemical reaction between the envelope material and the ceramic compact. The use of graphite powder as a pressure-transmitting medium likewise achieves these functions in an excellent fashion.

Care should be taken to give the pressure-transmitting powder adequate purling properties for optimum transfer of the contact pressure during the HIP process, and to give it sufficient grain size to prevent the non-sinterable grains from unduly penetrating the surface of the compact. The preferred grain size is in the 2 $\mu$m to 50 $\mu$m range, and various modifications using grain sizes within these limits may be of advantage.

Considering that the powder in which the compact is embedded must be enclosed in a container, care should be taken to select a container material that is compatible with the powder at the conditions of the process. The container material should also be selected such that it presents no problem when it is being joined to make the container gas-tight. Ultimately, the viscosity of the container material at the process conditions must be selected to fall within certain limits. Containers which have been shown to give special benefits and satisfy the above-mentioned requirements are those made of Mo, Zr, V, B, Cr, Nb, Ta, or Ti sheet material having a thickness of between 0.1 mm and 1 mm. Preferably, the container holding the pressure-transmitting powder and compact embedded therein is made of quartz glass having a wall thickness of 0.2 mm to 2 mm.

The following is a description of an embodiment of the method according to the present invention:

A quartz glass container having a wall thickness of about 1 m m is filled with pure $Si_3N_4$ powder of the $\beta$-phase and of different grain sizes within the 2 $\mu$m and to 50 $\mu$m range. Embedded in this powder is a compact consisting of reaction sintered $Si_3N_4$ and MgO as a sintering agent. The container is evacuated and sealed gas-tight by fusion. It is then exposed, in a hot isostatic press, to a pressure of about 3000 bars at a temperature of 1400° to 1700° C., the compact thus being compressed as intended. When the pressing process is completed and the container has cooled, the glass container is then broken by impact and the silicon nitride powder is removed from the fully pressed compact by tapping.

The invention has been shown and described in preferred form only, and by way of example, and many variations may be made in the invention which will still be comprised within its spirit. For example, the compact may comprise silicon carbide of the $\alpha$ or $\beta$-phase, and the pressure-transmitting powder may be pure silicon carbide of the $\alpha$-phase. It is understood, therefore, that the invention is not limited to any specific form or embodiment except insofar as such limitations are included in the appended claims.

We claim:

1. A method of hot isostatic pressing of a porous silicon ceramic compact, comprising the steps of:
   providing a fluid impermeable container and a powder,
   placing the compact and the powder within the container so that the compact is completely embedded in the powder, the powder thereby separating the compact from the container, and
   subjecting the container and its contents to heat and fluid pressure, the pressure being transmitted to the compact through the container and the powder, the heat and pressure being insufficient to sinter the powder and insufficient to cause the powder to chemically react with the compact.

2. A method as defined in claim 1 wherein the powder is the same material as the compact, except that the powder contains no sintering agent.

3. A method as defined in claim 2 wherein the compact comprises silicon nitride and a sintering agent, and the powder is substantially pure silicon nitride.

4. A method as defined in claim 3 wherein the substantially pure silicon nitride powder is of the $\beta$-phase.

5. A method as defined in claim 2 wherein the compact comprises silicon carbide of the α or β-phase, and the powder is substantially pure silicon carbide.

6. A method as defined in claim 5 wherein the pure silicon carbide powder is of the α-phase.

7. A method as defined in claim 1 wherein the powder is graphite powder.

8. A method as defined in claim 1 wherein the grain size of the pressure-transmitting powder is in the range between 2 μm and 50 μm.

9. A method as defined in claim 8 wherein the pressure-transmitting powder contains grains of different sizes within the range between 2 μm and 50 μm.

10. A method as defined in claim 1 wherein the container is made of sheet metal selected from the group consisting of Mo, Zr, V, B, Cr, Nb, Ta and Ti.

11. A method as defined in claim 1 wherein the sheet metal container has a wall thickness in range between 0.1 mm and 1 m m.

12. A method as defined in claim 1 wherein the container is made of quartz glass having a wall thickness of 0.2 m m to 2 m m.

* * * * *